Patented Jan. 16, 1951

2,538,310

UNITED STATES PATENT OFFICE 2,538,310

PROCESS FOR LIGHT-SALTING OF HERRINGS

Dortheus Andreas Hansen, Bestun, near Oslo, Norway, assignor to Kristian Gjolberg, Oslo, Norway No Drawing. Application March 19, 1947, Serial No. 735,788. In Norway June 9, 1945

Section 1, Public Law 690, August 8, 1946
Patent expires June 9, 1965

6 Claims. (Cl. 99—160)

The present invention has for its object a process for the salting of herrings and like fishes by means of which keepable products are obtained without introducing an excessive percentage of salt into the flesh of the fishes.

In order to make herrings keeping, salting has been made use of and salt herrings is a well known product in our house keeping. It is of high nutritive value, but many people do not exactly consider it as a delicacy. It is strongly contracted owing to the strong salting and its taste is much too salt.

The present invention has for its object to produce a salt herring of agreeable flavour, having a suitable salt taste, and which is not contracted but has retained its original volume and in which no disagreeable foreign taste is present.

By the process which is the object of the present invention the liquid employed as the storing agent is a dilute solution of kitchen salt, containing a mineral acid in a small quantity acting as a catalyst (for example between 0.05 and 0.1 pro mille of HCl), which is far below that which in itself has a preserving effect.

In carrying out the process in practice by the use of barrels as storing containers, one may suitably operate in the following manner:

The herrings in a gutted condition or with heads removed are suitably first treated with a comparatively weak salt brine, containing for example from 12 to 15 per cent of salt. For the sake of cleanliness this brine should be changed after some days in order to remove blood-water and mucous matter etc. After for example one week this brine is drawn off, whereupon the storage brine is filled in, the barrels being then ready for shipping or storing.

The storage brine may in addition to kitchen salt in an amount of for example 12–15 per cent also contain small quantities of other preserving agents, for example sugar, acetic acid and so on.

These preserving agents in small quantities are not sufficient to make herrings keeping as a commercial product, but according to the invention the preserving capacity can be increased quite considerably by the catalytical action of the small amount of mineral acid added.

As a catalyst hydro-chloric acid is preferably employed, because this acid has been found to exert a particularly prominent catalytic effect, at the same time as its use involves also other advantages. The addition to the brine of for example 0.50 to 1 pro mille of dilute hydro-chloric acid (10 per cent) so that the brine will contain from one twentieth to one tenth pro mille of hydro-chloric acid (CHl) has been found to be sufficient to increase the preserving effect of the preserving agents present to such a high degree that the keeping quality of the herrings is the same as in the case of strongly salted herrings. This minute quantity of hydro-chloric acid has in itself no preserving effect, but functions only as a catalyst.

Instead of using a salt brine in the preparatory treatment, hydro-chloric acid may also be used in this instance, it may be together with acetic acid for example in a quantity of one half per cent; this means that the preparatory liquid may have the same composition as the storage liquid. This latter brine suitably contains 12 to 15 per cent of kitchen salt, 0.5 to 1 pro mille of dilute hydro-chloric acid (10 per cent) and 0.50 to 0.60 per cent of acetic acid. It has also been found that by the use of a suitable temperature difference between the brine and the herrings, advantageous results may be attained. One may for example operate with a brine temperature of 50 to 60° C. It is possible also to operate in the manner that the brine is first heated to boiling temperature, whereupon it is cooled to 50 to 60° C. Under certain conditions the acetic acid may be omitted when temperature difference is made use of. But in practice an adjustment of temperature will in most cases involve too much extra labour and bring about too high increase in labour costs. The most simple method consists in only using brine containing only salt, acetic acid and the catalyst in the percentage above referred to without regard to the temperatures at the time when the brine is poured in.

The treatment of the herrings may take place in tanks or directly in barrels. The latter practice has been found to be quite satisfactory.

The present invention comprises the treatment of herrings of any type (such as menhaden) as well as of other fat fishes of a like character.

I claim:

1. Process for the light-salting of herrings which comprises immersion of the herrings in an aqueous liquid containing 0.05–0.1 pro mille of HCl, keeping the herrings immersed in this liquid for a plurality of days, removing the liquid from the herrings and immersing the herrings in a storage brine containing 0.05–0.1 pro mille of HCl and maintaining the herrings immersed in such storage brine during storage and transportation.

2. Process according to claim 1 in which the liquid in which the herrings are kept immersed prior to the application of the final storage brine is removed from the herrings after a period of time not less than a week.

3. Process according to claim 1 in which the storage brine contains common salt in a quantity, which is not above 15 percent.

4. Process according to claim 1 in which the storage brine contains a small quantity of acetic acid.

5. Process for the light-salting of herrings which comprise the steps of immersing the herrings in a weak salt brine containing 0.05-0.1 pro mille of HCl, keeping the herrings immersed in said brine for several days, removing said brine and then immersing the herring in a fresh batch of brine of substantially the same composition as that first employed during storage and transportation.

6. Process according to claim 5 in which the immersion treatment is repeated several times in fresh batches of brine of the specified character.

DORTHEUS ANDREAS HANSEN.

REFERENCES CITED

The following references are of record in the file of this patent:

UNITED STATES PATENTS

| Number | Name | Date |
|---|---|---|
| 1,003,320 | Baumann | Sept. 12, 1911 |
| 1,046,991 | Danilevsky | Dec. 10, 1912 |
| 1,223,790 | Holzapfel | Apr. 24, 1917 |
| 2,064,872 | Ash et al. | Dec. 22, 1936 |

FOREIGN PATENTS

| Number | Country | Date |
|---|---|---|
| 18,345 of 1911 | Great Britain | Aug. 14, 1912 |